United States Patent [19]

Maruyama et al.

[11] 4,429,364

[45] Jan. 31, 1984

[54] SEWING MACHINE-PATTERN DATA PROCESSOR

[75] Inventors: Hisaichi Maruyama; Yasuji Matsumoto, both of Amagasaki, Japan

[73] Assignee: Mitsubishi Denki Kabushiki Kaisha, Tokyo, Japan

[21] Appl. No.: 498,689

[22] Filed: Jun. 1, 1983

Related U.S. Application Data

[63] Continuation of Ser. No. 183,635, Sep. 3, 1980, abandoned.

[30] Foreign Application Priority Data

Sep. 3, 1979 [JP] Japan .............................. 54-112535

[51] Int. Cl.³ ...................... G06F 15/46; D05B 19/00
[52] U.S. Cl. .............................. 364/400; 112/121.11;
112/158 E; 364/189; 364/191
[58] Field of Search ............... 364/400, 470, 188–193;
318/568; 112/121.11, 121.12, 158 E, 275, 277

[56] References Cited

U.S. PATENT DOCUMENTS

| | | | |
|---|---|---|---|
| 3,982,491 | 9/1976 | Herzer et al. | 112/121.12 |
| 4,116,143 | 9/1978 | Manabe | 318/568 X |
| 4,160,422 | 7/1979 | Barber et al. | 112/121.11 |
| 4,169,422 | 10/1979 | Hayes et al. | 112/121.12 |
| 4,190,007 | 2/1980 | Kimura et al. | 112/121.12 |
| 4,201,144 | 5/1980 | Manabe et al. | 112/121.12 |

OTHER PUBLICATIONS

Toshiba, PTS-550A Type Pattern Seamer.
BAS-300 (Brother's Profile M-BAS-300).

*Primary Examiner*—Joseph F. Ruggiero
*Attorney, Agent, or Firm*—Oblon, Fisher, Spivak, McClelland & Maier

[57] ABSTRACT

A sewing machine-pattern data processor including a coordinate input device for outputting coordinate positions on a plane by means of a manually operable stylus; an arithmetic and logic unit which receives the sewing machine pattern data input from the coordinate input device to convert the data to command data for a predetermined sewing machine unit control operation; a memory for memorizing the command data converted by the arithmetic and logic unit; and a write-in device which reads out the data of the memory to write-in a non-volatile recording medium.

6 Claims, 6 Drawing Figures

FIG. 3

| 15 14 13 | 8 7 | 6 5 | 0 |
|---|---|---|---|
| F1 | X | F2 | Y |

```
F1  00 —                F2  00 (NEEDLE STOP)
    01 (STITCH SHIFT)       01 (LOW SPEED)
    10 (THREAD CUT)         10 (MIDDLE SPEED)
    11 (CLOTH MOVE)         11 (HIGH SPEED)
```

FIG. 4

| (STITCH) | 15 14 13 | 8 7 | 6 5 | 0 | |
|---|---|---|---|---|---|
| 0  | 01 | 000000 | 10 | 000000 | (START) |
| 1  | 01 | 010010 | 10 | 001010 | ⎫ |
| 2  | 01 | 010010 | 10 | 001010 | ⎪ |
| 3  | 01 | 010010 | 10 | 001010 | ⎪ |
| 4  | 01 | 010010 | 10 | 001010 | P₀ → P₁ |
| 5  | 01 | 010010 | 10 | 001010 | ⎪ |
| 6  | 01 | 010010 | 10 | 001010 | ⎪ |
| 7  | 01 | 010010 | 10 | 001010 | ⎭ |
| 8  | 01 | 001010 | 10 | 110001 | ⎫ |
| 9  | 01 | 000010 | 10 | 101100 | ⎪ |
| 10 | 01 | 111000 | 10 | 101110 | ⎪ |
| 11 | 01 | 110001 | 10 | 110110 | ⎪ |
| 12 | 01 | 110110 | 10 | 110001 | ⎪ |
| 13 | 01 | 000011 | 10 | 101100 | ⎪ |
| 14 | 01 | 000100 | 10 | 101110 | ⎪ |
| 15 | 01 | 111100 | 10 | 101110 | P₁ → P₂ |
| 16 | 01 | 110000 | 10 | 110101 | ⎪ |
| 17 | 01 | 011000 | 10 | 111100 | ⎪ |
| 18 | 01 | 101110 | 10 | 100001 | ⎪ |
| 19 | 01 | 110010 | 10 | 001110 | ⎪ |
| 20 | 01 | 110010 | 10 | 001110 | ⎭ |
| 21 | 01 | 110000 | 10 | 000000 | P₃ |
| 22 | 01 | 001100 | 10 | 001110 | P₄ |
| 23 | 01 | 110010 | 10 | 111010 | P₅ |
|    | 10 | 000000 | 00 | 000000 | (THREAD CUT) |
| 24 | 11 | 110111 | 00 | 010100 | (CLOTH MOVE) |
| 25 | 11 | 110111 | 00 | 010100 | |
| 26 | 00 | 000000 | 00 | 000000 | (DATA FINISH) |

SEWING MACHINE-PATTERN DATA PROCESSOR

This application is a continuation of application Ser. No. 183,635, filed Sept. 3, 1980; abandoned.

BACKGROUND OF THE INVENTION

1. Field of the Invention

The present invention relates to a data processor for preparing various sewing machine-pattern data.

2. Description of the Prior Arts

In the field of industrial electronic sewing machines, use has been made of automatic sewing machines which automatically sew clothes in desired patterns by driving each cloth or needle depending upon predetermined sewing data programmed and recorded in a memory device. The sewing data are recorded in recording media of the memory device. Different sewing pattern can be easily provided by exchanging the recording medium. The recording medium can be a semiconductor memory, a magnetic card etc. The control data for controlling the operation of the sewing machine are recorded in order of the sewing operation. The sewing data comprise data for relative shifting displacement between the needle and the cloth in each stitch for the sewing pattern and the command for controlling the sewing speed and other movements. Thus, in order to carry out the automatic sewing for a desired sewing pattern by the automatic sewing machine, it is necessary to prepare certain control data corresponding to the sewing pattern and to write-in a desired recording medium.

Heretofore, in the preparation of such data, the desired sewing pattern is written on a section paper and the coordinates for each of the stitches (stitch points) are read-out in the order for sewing to prepare the data and then, the data are written in the recording medium. In such a process, the operation for read-out of the coordinate for stitches (stitch points) is not easily carried out without failure and takes a remarkably long time. It takes a long time depending upon the complication of the sewing pattern.

SUMMARY OF THE INVENTION

It is an object of the present invention to provide a sewing machine-pattern data processor which gives sewing data by an automatic operation with high accuracy and high speed.

The foregoing and other objects of the present invention have been attained by providing a sewing machine-pattern data processor which comprises a coordinate input device for outputting coordinate points on a plane which are designated by a stylus; an arithmetic and logic unit which receives the sewing machine-pattern data input from the coordinate input device and converts the data to command data for the predetermined sewing machine unit control operation; a memory for memorizing the command data converted by the arithmetic and logic unit; and a write-in device which reads out the data of the memory to write-in a non-volatile recording medium.

The coordinate input device includes a data digitizer.

BRIEF DESCRIPTION OF THE DRAWINGS

FIG. 3 shows a format of the control data obtained by the embodiment of the invention;

FIG. 4 shows the control data given by the embodiment of the invention;

DETAILED DESCRIPTION OF THE PREFERRED EMBODIMENTS

Figure 1:
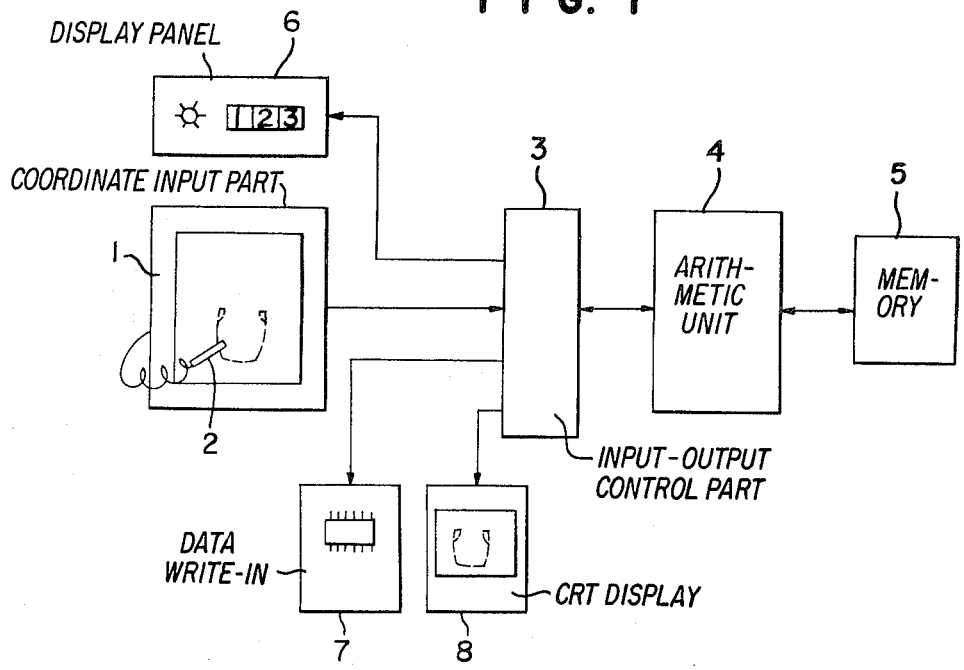
FIG. 1 is a block diagram of one embodiment of the present invention.

Referring to the drawings, the present invention will be illustrated in detail.

FIG. 1 is a block diagram of one embodiment of the present invention. In FIG. 1, the reference numeral (1) designates a coordinate input unit. When a stylus pen (2) is brought into contact with the effective plane of the coordinate input unit, data for the coordinates of the contacted points are output with a predetermined resolving power (such as 0.1 mm). The output of the coordinate input unit is fed through an input-output control unit (3) to an arithmetic and logic unit (4). The control data operated in the unit are stored in a memory. The conditions of the operation of the processor are displayed by various lamps on a display panel (6) connected to the input-output control unit (3). The data of the memory (5) are output through the arithmetic unit (4) and the input-output control unit (3) to a data write-in unit (7) and a CRT display unit (8). The data write-in unit (7) receives the control data of the memory (5) and writes the data in the recording medium for the sewing machine. The CRT display unit (8) reproduces the control data on a cathode-ray tube so as to confirm the input data.

The order and operation for preparing the control data for the sewing machine by the processor having the above-mentioned structure will be illustrated in detail.

Figure 2:
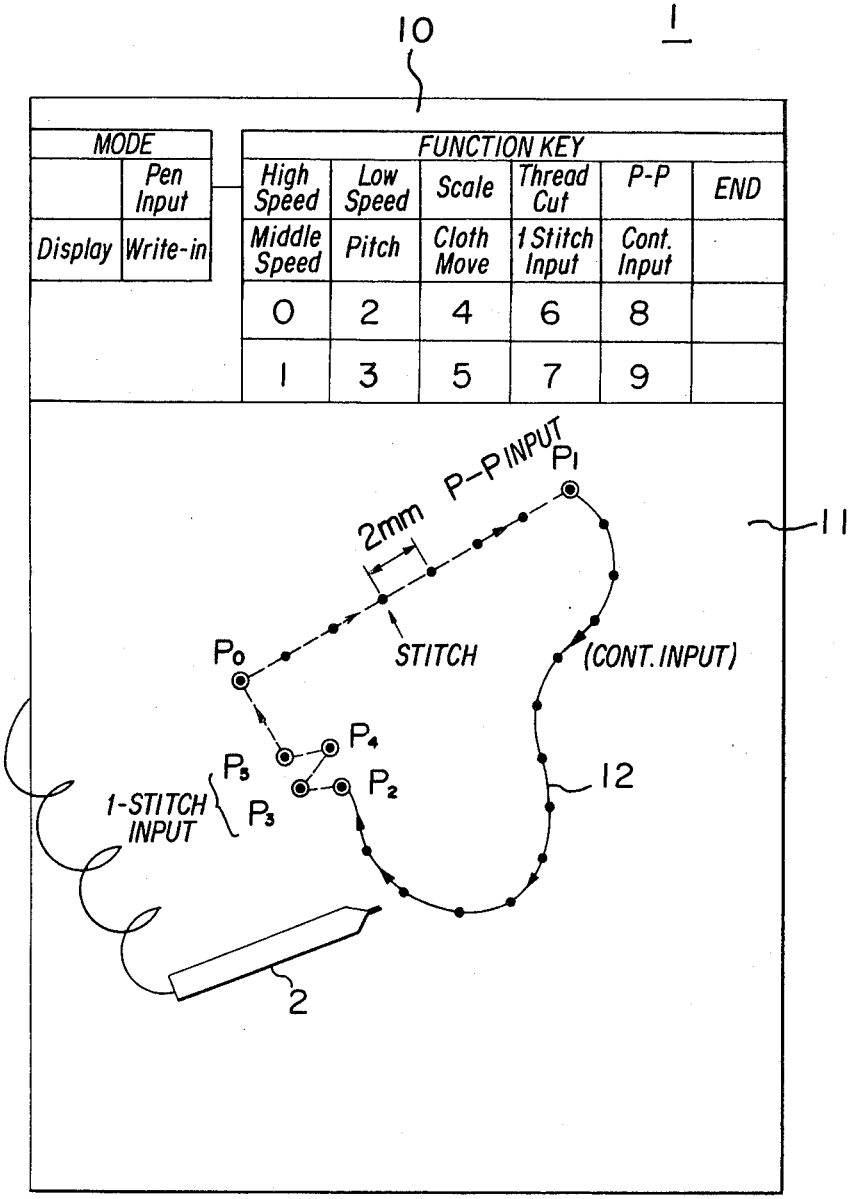
FIG. 2 is an enlarged view of the coordinate input part of the embodiment of the invention.

FIG. 2 is an enlarged view of the effective plane of the embodiment of the coordinate input unit (1). The input plane is divided into a function input part (10) and a pattern input part (11). The input plane of the function input part (10) is partitioned into selected sections. When the stylus pen (2) is brought into contact with contacted sections, the positions of the contacted sections are detected by the arithmetic and logic unit (4) so as to operate depending upon the sections whereby it imparts the same functions as many switches for the operation. The sections are designated for the steps of the operation to impart the following functions.

(A) Mode selection:
  (a) pen input:
    The operation mode for inputting the function key input and the pattern input by the contacts of the stylus pen to prepare the control data in the memory (5).
  (b) display:
    The mode for outputting the control data of the memory on the CRT display part (8) to display the input pattern on the cathode-ray tube.
  (c) write-in:
    The mode for outputting the control data of the memory in the data write-in part (7) to write-in the data in the recording medium.

(B) Function key input:
  (a) high middle and low speed:
    The speeds for sewing are input.

(b) pitch:
  The sizes of stitches are designated by Figure keys (0 to 9).
(c) scale:
  The enlarged ratios of the pattern input from the pattern input part are designated by figure keys (0 to 9).
(d) thread cutting:
  The command for thread cut operation is prepared.
(e) stitch input:
  The stitches are given in order at the points contacting the stylus pen on the pattern input part,
(f) p-p input:
  The point to point inputs are designated. Each space from the former designated point to the following designated point contacted with the stylus pen, is divided into equal pitch which are similar to the designated pitch to prepare integer stitches.
(g) continuous input:
  The stitches having the designated pitch are given on a desired curve drawn by the stylus pen on the pattern input part.
(h) cloth movement:
  Only position of the cloth is given without forming the stitches from the former designated point to the following designated point on the pattern input part.
(i) END:
  The input by the stylus pen is finished.

The pattern input part (11) is the part for inputting the sewing pattern by the stylus pen (2).

The operation for the sewing pattern (12) shown in FIG. 2 in which the pitch is 2 mm and the pattern is not enlarged (1 time) will be illustrated.

| Order | Operation and condition | Stylus pen designated position |
|---|---|---|
| 1 | Select the pen input mode | (pen input) |
| 2 | Designate the sewing pitch of 2 mm (0.1 mm unit) | (2)(0) (pitch) |
| 3 | Designate the scale 1 | (1) (scale) |
| 4 | Designate the sewing speed. The sewing speed will be kept at the middle speed. | (middle speed) |
| 5 | Input the starting point Po. The data for starting the needle of the sewing machine are formed in the memory. | (Po) |
| 6 | Designate the P1 point by the point to point input. The data for straight sewing from Po to P1 each with a pitch of 2 mm are formed in the memory. | (p-p input) (P1) |
| 7 | Continuous contact of the stylus pen from P1 to P2 by the continuous input. The data for controlling stitches each having pitch of 2 mm on the contacted line of the stylus pen are formed in the memory. | (continuous input) (P1-P2) |
| 8 | Designate P3, P4, P5 points in sequence by the stitch input. | (stitch input) (P3) (P4) (P5) |
| 9 | Command thread cutting. The data for stopping of the needle and thread cutting are formed. | (thread cut) |
| 10 | Returning the cloth to Po point. The data for determining the position of the cloth are formed. | (cloth move) (Po) |
| 11 | Finish the pen input. The data for finish are formed. | (END) |

The data for the sewing pattern shown in FIG. 2 are given by such operation.

The operation for forming the control data for the sewing pattern with the coordinate data outputting from the coordinate input part (1) by the operation of the stylus pen (2) can be performed by the arithmetic and logic unit (4) of the microcomputer.

The control data for the sewing pattern decide the operation of one stitch by the sewing machine. The control data are given in the format shown in FIG. 3.

The control data for one stitch are formed of 16 bits. The shift displacements of the cloth in the Y direction and the X direction of the stitch are designated by bits 0 to 5 and bits 8 to 13 of the 16 bits. The control data for the auxiliary operation and the sewing speed are designated by bits 14 and 15 as $F_1$ and bits 6 and 7 as $F_2$.

The sewing pattern inputs from the coordinate input part are converted into the operation command data for one stitch by the operation of the arithmetic and logic unit (4) to sequentially write-in the memory (5). At the completion of the pattern data write in, the completion of data is indicated by write-in of the data "0" in all of the bits 0 to 15. The control data for the sewing pattern shown in FIG. 2 are shown in FIG. 4. During the formation of the data, the order of the operation of the stylus pen (2) input from the coordinate input unit (1) and the confirmation of the function key or the operation of the arithmetic and logic unit (4) are sequentially output, by the arithmetic and logic unit (4), on the display unit, so as to assist the operator.

The control data formed in the memory (5) by such operation are copied and written in the semiconductor programmable Read Only Memory (PROM) set in the data write-in by switching the operation mode to the write-in mode. The PROM is the recording medium for the automatic sewing machine. The recorded PROM is inserted into the automatic sewing machine, whereby the automatic sewing with the sewing pattern formed by the processor can be performed.

The recording medium can be not only a PROM but also other recording media such as magnetic cards and magnetic tapes.

In the coordinate input unit (1) of the embodiment, various operation keys are equipped on the function input part. The desired data forming order can be given by the selective operation of the operation keys by the stylus pen (2). The operation order is sequentially displayed on the display panel (6).

Figure 5:
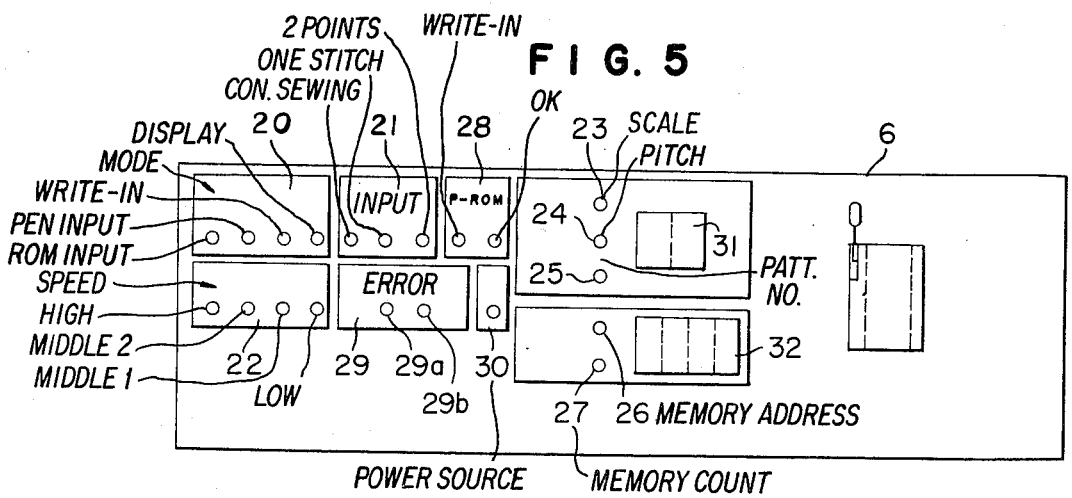
FIG. 5 is a schematic view of a display panel.

As shown in FIG. 5, the displays on the display panel (6) comprise displays corresponding to those of the function input part (10).

1. mode display (20)

2. data input type display (21)
3. sewing speed display (22)
4. displays for distance, stitch pitch and pattern number (23), (24), (25) and the figure display (31) thereof.

The following displays are given on the display panel (6) of the embodiment.

5. displays for ROM address and memory number (26), (27) . . . to display the write-in top address in the ROM write-in or to display the used memory number in the formation of the data and the used memory number of the pattern in the ROM input on the figure display part (32).
6. display for ROM write-in operation (28) . . . to display the fact of the ROM write-in operation and the finish of the correct ROM write-in.
7. error display (29) . . . to display various erroneous operations for correctable or incorrectable.
8. power source display (30) . . . to display ON and OFF of the power source.

In accordance with the embodiment, the next orders of the operation are displayed by glitter display on the operation panel (6) each input of the operation key by the stylus pen (12). The designated order of the operation is key-input by stylus pen (12) whereby the selected order is displayed by the lamp upon turning off the other orders. Thus, the data can be precisely formed without skill even though the orders of the operation are complicated.

Various sewing data can be formed by the data processor. The sewing data of the recording medium such as P-ROM are read out to perform the monitor display on the CRT display part (8).

Figure 6:
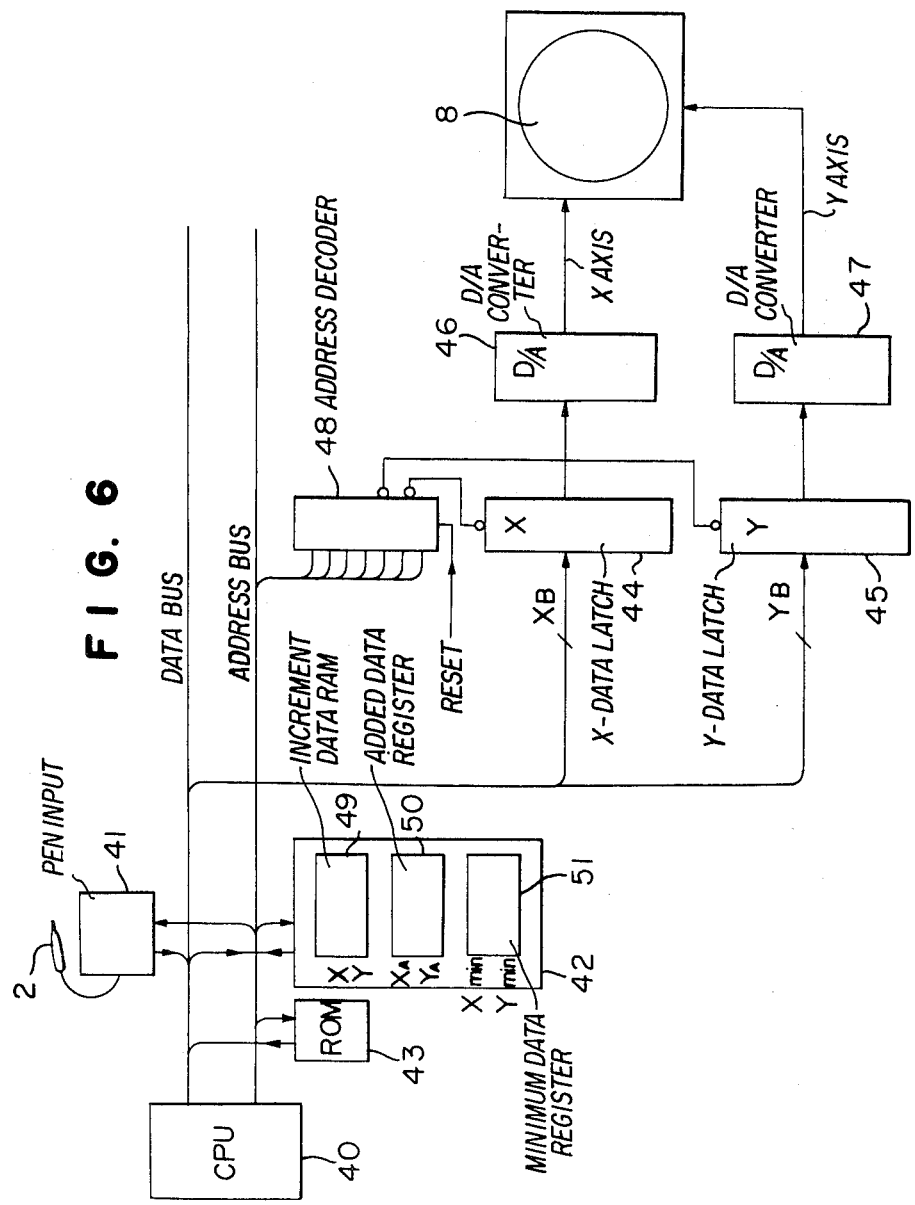
FIG. 6 is a block diagram of an input-output control device and an arithmetic unit.

FIG. 6 shows the control device for the monitor display of the sewing data in the memory as the optimum embodiment in the computer implementation of the input-output control unit (3) and the arithmetic part (4). The computer implementation comprises the CPU (40). Various key signals and pattern signals given by the contacts of the stylus pen (2) are fed into the CPU (40) by the pen input part (41) and processed and written in the RAM (42) used as the memory for storing the sewing data. After finishing the following monitor operation, the data are copied in the ROM (43) as the recording medium. The pattern data converted into absolute value data for the monitor of the sewing data, are memorized in an X data latch (44) and a Y data latch (45). The memorized data are converted into analog signals by the DA converters (46), (47) to be displayed as the pattern display by the CRT display (8). An address decoder (48) is used for the address control of the data latches (44), (45). The addresses of the data latches (44), (45) are selected by the CPU (40). The RAM (42) comprises the increment data RAM (49) for memorizing the increment data in the data input step by the stylus pen (2) and also the added data register (50) for memorizing the added data in the monitor display and the minimum register (51) for deciding the pattern basic position of the CRT display (8).

The conversion from the increment data into the absolute value data by the processor shown in FIG. 6 will be illustrated.

When the stylus pen (2) is brought into contact with the pattern display key (FIG. 2), the increment data memorized in the increment data RAM (49) are sequentially added to obtain the basic pattern position on the CRT display (8). The basic pattern position in the embodiment is detected by the minimum data of the absolute values of the sewing pattern. The stitch for the minimum data is set at the origin for the CRT display (8) whereby the deviation of the pattern out of the display panel can be prevented without failure.

In the detection of the minimum data, the data in the increment data RAM (49) are sequentially added to hold the data in the added data register (50). The coordinate $X_A$, $Y_A$ of the sewing pattern is measured. These coordinates are compared and held in sequence by the minimum data register (51). That is, the minimum data register detects the minimum values of the coordinates $X_A$, $Y_A$ of the sewing pattern to hold the minimum value. Thus, when the hold of the minimum data (X min., Y min.) is finished by the addition of all of the increment data, the increment data (X, Y) are again sequentially added whereby the sewing pattern coordinates $X_A$, $Y_A$ are sequentially held in the added data register (50).

In the second and following additions, the added sewing pattern coordinates $X_A$, $Y_A$ and the minimum data X min., Y min. are operated by the CPU (40) to obtain the monitor display pattern coordinate $X_B$, $Y_B$. According to the command of the address decoder (48), the data are fed into the X data latch (44) and the Y data latch (45). The coordinate $X_B$, $Y_B$ are converted into the analog signals by the converters (46), (47) to display the data as the pattern display on the CRT display (8). In the CRT display (8), the monitor display of the position of the stitch of the minimum data at the origin of the coordinate and the sewing data held in the RAM (49) can be previously confirmed.

In accordance with the sewing machine-pattern data processor of the present invention, the sewing pattern can be input, by the coordinate input device, in the sewing orders of the typical points of the trace of the pattern or the trace pattern itself. Moreover, the control data for the sewing pitch, the scale of the pattern, the sewing speed, the thread cut and the cloth movement which can not shown in a picture are input by the function keys from the input plane of the coordinate input device whereby the control data for the automatic sewing machine can be formed by simple manner and in intuition and high accuracy.

We claim:

1. A sewing machine-pattern data processor for producing pattern data adaptable for controlling operation of an automatic sewing machine, comprising:

a co-ordinate input device separate from said sewing machine, comprising an input plane defining plural co-ordinate positions, a manually operable stylus for selecting selected of said co-ordinate positions corresponding to a sewing pattern and means for forming sewing machine pattern data based on the selected co-ordinate positions;

an arithmetic and logic unit which receives the sewing machine pattern data input from the co-ordinate input device and converts the data to command data for a predetermined sewing machine unit control operation;

a memory for memorizing the command data converted by the arithmetic and logic unit;

a write-in device which reads out the data of the memory and writes the data in a non-volatile recording medium;

a pattern output device which outputs a command data memorized in the memory and includes a CRT display for displaying the sewing machine pattern.

2. The pattern data processor according to claim 1 wherein:

the input plane of said co-ordinate input device comprises a function input part divided into sections corresponding to an operating function of said co-ordinate input device and sections corresponding to control functions for controlling the sewing machine, and a pattern input part for inputting sewing patterns of the sewing machine; and said co-ordinate input device includes means for setting all operation functions, control functions, and the sewing machine pattern data by the operation of the stylus from the input plane of the co-ordinate input device.

3. The pattern data processing according to claim 2 which comprises an operation and control display for displaying the operation and control functions for the input of the sewing machine pattern.

4. The pattern data processor according to claim 1 which comprises at least one of the following means:
 (a) means for forming stitches by dividing a space between a designated two points into integer equal pitches substantially the same as a desired pitch;
 (b) means for forming stitches in said pitches on the continuous trace designated by the stylus; and
 (c) means for forming each stitch at each point designated by the stylus.

5. The pattern data processor according to claim 2 which comprises:

means for processing the set operation and control functions and the sewing pattern data input from the coordinate input device to enlarge or contract a size of the sewing pattern.

6. The pattern data processor according to claim 3, which comprises:

an operation display for displaying the operation orders for the input of the sewing pattern.

* * * * *